(12) United States Patent
Rodatz et al.

(10) Patent No.: US 9,086,008 B2
(45) Date of Patent: Jul. 21, 2015

(54) METHOD AND DEVICE FOR OPERATING AN INTERNAL COMBUSTION ENGINE

(75) Inventors: Paul Rodatz, Landshut (DE); Thorsten Rosenkranz, Regensburg (DE); Sebastian Viehöyer, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 3 days.

(21) Appl. No.: 13/994,909

(22) PCT Filed: Dec. 7, 2011

(86) PCT No.: PCT/EP2011/071986
§ 371 (c)(1),
(2), (4) Date: Jun. 17, 2013

(87) PCT Pub. No.: WO2012/080046
PCT Pub. Date: Jun. 21, 2012

(65) Prior Publication Data
US 2013/0269319 A1  Oct. 17, 2013

(30) Foreign Application Priority Data
Dec. 16, 2010  (DE) .......................... 10 2010 063 215

(51) Int. Cl.
*F01N 3/00* (2006.01)
*F01N 11/00* (2006.01)
(Continued)

(52) U.S. Cl.
CPC .............. *F01N 11/00* (2013.01); *F01N 11/007* (2013.01); *F02D 41/1456* (2013.01);
(Continued)

(58) Field of Classification Search
CPC . F01N 11/00; F01N 11/007; F01N 2560/025; F02D 2041/1409; F02D 2041/1432; F02D 41/1456; F02D 41/222; F02D 41/2458; Y02T 10/47

USPC .................................. 60/274, 276, 285, 299
See application file for complete search history.

(56) References Cited

U.S. PATENT DOCUMENTS

| 4,397,278 A | 8/1983 | Hughes .......................... 123/694 |
| 5,291,673 A | 3/1994 | Hamburg et al. ............... 60/274 |

(Continued)

FOREIGN PATENT DOCUMENTS

| CN | 1969114 A | 5/2007 | |
| DE | 19752965 A1 | 6/1999 | .............. F01N 11/00 |

(Continued)

OTHER PUBLICATIONS

International Search Report and Written Opinion, Application No. PCT/EP2011/071986, 17 pages, Mar. 14, 2012.

*Primary Examiner* — Thomas Denion
*Assistant Examiner* — Diem Tran
(74) *Attorney, Agent, or Firm* — Slayden Grubert Beard PLLC

(57) ABSTRACT

An internal combustion engine has an exhaust gas sensor upstream of or in an exhaust gas catalytic converter, and having a measurement signal corresponding to a residual oxygen content of the exhaust gas flowing past the exhaust gas sensor. For operation, an air ratio is specified, a specified forced stimulation is applied thereto, and at least one actuator that influences the mixture is set by appropriately controlling the actuator. In correlation with a rising edge of the forced stimulation, a first maximum value of the air ratio is determined according to the signal profile of the exhaust gas sensor measurement signal during a first measurement duration, and a second maximum value of the air ratio is determined according to the exhaust gas sensor measurement signal during a subsequent second measurement duration. A first sensor characteristic value is determined based on the first and second maximum values.

13 Claims, 4 Drawing Sheets

(51) Int. Cl.
  *F02D 41/14* (2006.01)
  *F02D 41/24* (2006.01)
  *F02D 41/22* (2006.01)

(52) U.S. Cl.
  CPC ...... *F02D 41/2458* (2013.01); *F01N 2560/025* (2013.01); *F02D 41/222* (2013.01); *F02D 2041/1409* (2013.01); *F02D 2041/1432* (2013.01); *Y02T 10/47* (2013.01)

(56) References Cited

U.S. PATENT DOCUMENTS

| | | | |
|---|---|---|---|
| 5,623,824 A | 4/1997 | Yukawa et al. | 60/276 |
| 6,105,366 A | 8/2000 | Zhang | 60/274 |
| 6,931,838 B2 * | 8/2005 | Kawamura | 60/276 |
| 7,069,719 B2 * | 7/2006 | Takubo et al. | 60/285 |
| 7,143,577 B2 * | 12/2006 | Yoshioka | 60/285 |
| 7,240,479 B1 * | 7/2007 | Fujimoto | 60/277 |
| 7,603,845 B2 | 10/2009 | Dionnet et al. | 60/274 |
| 7,779,619 B2 * | 8/2010 | Takubo | 60/277 |
| 7,874,285 B2 | 1/2011 | Barnikow et al. | 123/688 |
| 8,196,460 B2 | 6/2012 | Barnikow et al. | 73/114.69 |

FOREIGN PATENT DOCUMENTS

| | | | | |
|---|---|---|---|---|
| DE | 102006047188 A1 | 4/2008 | | F01N 11/00 |
| DE | 102006047190 B3 | 4/2008 | | F01N 11/00 |
| EP | 799987 B1 | 7/2003 | | |
| GB | 2281641 A | 3/1995 | | |
| WO | 2012/080046 A1 | 6/2012 | | F01N 11/00 |

* cited by examiner

US 9,086,008 B2

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2011/071986 filed Dec. 7, 2011, which designates the United States of America, and claims priority to DE Application No. 10 2010 063 215.5 filed December 16, the contents of which are hereby incorporated by reference in their entirety.

TECHNICAL FIELD

This disclosure relates to a method and a device for operating an internal combustion engine having an exhaust gas probe which is arranged in an exhaust system of the internal combustion engine upstream of or in an exhaust gas catalytic converter and whose measurement signal is characteristic of a residual oxygen content of the exhaust gas which flows past said exhaust gas probe.

BACKGROUND

Ever stricter legal requirements in terms of admissible emissions of pollutants of motor vehicles in which internal combustion engines are arranged make it necessary to keep the emissions of pollutants as low as possible during operation of the internal combustion engine. This can occur, on the one hand, by virtue of the fact that there is a reduction in the emissions of pollutants which are produced during the combustion of the air/fuel mixture in the respective cylinder of the internal combustion engine. On the other hand, exhaust gas post-treatment systems are in use in internal combustion engines, which exhaust gas post-treatment systems convert the emissions of pollutants which are generated during the combustion process of the air/fuel mixture in the respective cylinders into harmless substances. For this purpose, exhaust gas catalytic converters are used which convert carbon monoxide, hydrocarbons and nitrogen oxides into harmless substances. Both the targeted influencing of the generation of the emissions of pollutants during the combustion and the conversion of the components of the pollutants with a high level of efficiency by the exhaust gas catalytic converter require a very precisely set air/fuel ratio in the respective cylinder.

Furthermore, ever stricter requirements are also with respect to the diagnosis of components which are relevant to pollutants. For example, dynamically slow exhaust gas probes have an adverse effect on the emissions of pollutants. In this respect, the detection of dynamically slow exhaust gas probes is an important element for meeting legal requirements, such as the on-board diagnostic regulations (OBD). Previously, the regulations for on-board diagnostics concentrated on symmetrically aged probes, that is to say the dynamics of the rich/lean and lean/rich direction did not differ significantly. More recent OBD regulations now also require asymmetrically aged exhaust gas probes to be detected. Here, it is assumed that the impairment of the dynamics acts in only one direction, while the other direction still has a nominal behavior. Along with an asymmetrically aged exhaust gas probe there is significant worsening of the emissions of pollutants owing to displacement of the center position of the mixture. This is based on differences between the measured profile and the expected profile of the excess air ratio during the forced excitation. The lambda control reacts to this and displaces the center position of the mixture in accordance with the asymmetry.

SUMMARY

One embodiment provides a method for operating an internal combustion engine having an exhaust gas probe which is arranged in an exhaust system of the internal combustion engine upstream of or in an exhaust gas catalytic converter and whose measurement signal is characteristic of a residual oxygen content of the exhaust gas which flows past it, in which method: an excess air ratio is predefined, has a predefined forced excitation applied thereto and is set by corresponding actuation of at least one actuator device which influences the mixture; in a fashion correlating with a rising edge of the forced excitation: a first measuring time period is predefined and a maximum value of the excess air ratio, represented by the measurement signal of the exhaust gas probe, is determined as a function of the signal profile of the measurement signal of the exhaust gas probe during the first measuring time period, specifically as a first maximum value, and a second measuring time period is predefined after the first measuring time period, and a maximum value of the excess air ratio, represented by the measurement signal of the exhaust gas probe, is determined as a function of the signal profile of the measurement signal of the exhaust gas probe during the second measuring time period, specifically as a second maximum value; and a first probe characteristic value is determined as a function of the first and the second maximum value.

In a further embodiment, in a fashion correlating with a falling edge of the forced excitation: a third measuring time period is predefined and a minimum value of the excess air ratio, represented by the measurement signal of the exhaust gas probe, is determined as a function of the signal profile of the measurement signal of the exhaust gas probe during the third measuring time period, specifically as a first minimum value, and a fourth measuring time period is predefined after the third measuring time period, and a minimum value of the excess air ratio, represented by the measurement signal of the exhaust gas probe, is determined as a function of the signal profile of the measurement signal of the exhaust gas probe during the fourth measuring time period, specifically as a second minimum value; and a second probe characteristic value is determined as a function of the first and second minimum values.

In a further embodiment, a third probe characteristic value, which is representative of an asymmetrical change in the measurement signal behavior of the exhaust gas probe, is determined as a function of the first and second probe characteristic values.

In a further embodiment, the first probe characteristic value is determined as a function of a difference between the first and second maximum values.

In a further embodiment, the second probe characteristic value is determined as a function of a difference between the first and second minimum values.

In a further embodiment, the third probe characteristic value is determined as a function of a ratio of the first probe characteristic value to the second probe characteristic value.

In a further embodiment, the third probe characteristic value is determined by means of a characteristic diagram as a function of the first and the second probe characteristic value.

In a further embodiment, the third probe characteristic value is adapted as a function of a correction value which is determined as a function of a rotational speed of a crankshaft of the internal combustion engine and/or a load variable.

In a further embodiment, a system model of a lambda controller is adapted as a function of the third probe characteristic value.

In a further embodiment, a predefined excess air ratio is adapted as a function of the third probe characteristic value.

Another embodiment provides a method for operating an internal combustion engine having an exhaust gas probe which is arranged in an exhaust system of the internal combustion engine upstream of or in an exhaust gas catalytic converter and whose measurement signal is characteristic of a residual oxygen content of the exhaust gas which flows past it, in which method: an excess air ratio is predefined, has a predefined forced excitation applied thereto and is set by corresponding actuation of at least one actuator device which influences the mixture; in a fashion correlating with a falling edge of the forced excitation: a third measuring time period is predefined and a minimum value of the excess air ratio, represented by the measurement signal of the exhaust gas probe, is determined as a function of the signal profile of the measurement signal of the exhaust gas probe during the third measuring time period, specifically as a first minimum value, and a fourth measuring time period is predefined after the third measuring time period, and a minimum value of the excess air ratio, represented by the measurement signal of the exhaust gas probe, is determined as a function of the signal profile of the measurement signal of the exhaust gas probe during the fourth measuring time period, specifically as a second minimum value; and a second probe characteristic value is determined as a function of the first and second minimum values.

Another embodiment provides a device for operating an internal combustion engine having an exhaust gas probe which is arranged in an exhaust system of the internal combustion engine upstream of or in an exhaust gas catalytic converter and whose measurement signal is characteristic of a residual oxygen content of the exhaust gas which flows past it, which device is designed such that: an excess air ratio is predefined, has a predefined forced excitation applied thereto and is set by corresponding actuation of at least one actuator element which influences the mixture; in a fashion correlating with a rising edge of the forced excitation: a first measuring time period is predefined and a maximum value of the excess air ratio, represented by the measurement signal of the exhaust gas probe, is determined as a function of the signal profile of the measurement signal of the exhaust gas probe during the first measuring time period, specifically as a first maximum value, and a second measuring time period is predefined after the first measuring time period, and a maximum value of the excess air ratio, represented by the measurement signal of the exhaust gas probe, is determined as a function of the signal profile of the measurement signal of the exhaust gas probe during the second measuring time period, specifically as a second maximum value; and a first probe characteristic value is determined as a function of the first and the second maximum value.

Another embodiment provides a device for operating an internal combustion engine having an exhaust gas probe which is arranged in an exhaust system of the internal combustion engine upstream of or in an exhaust gas catalytic converter and whose measurement signal is characteristic of a residual oxygen content of the exhaust gas which flows past it, which device is designed such that: an excess air ratio is predefined, has a predefined forced excitation applied thereto and is set by corresponding actuation of at least one actuator device which influences the mixture; in a fashion correlating with a falling edge of the forced excitation: a third measuring time period is predefined and a minimum value of the excess air ratio, represented by the measurement signal of the exhaust gas probe, is determined as a function of the signal profile of the measurement signal of the exhaust gas probe during the third measuring time period, specifically as a first minimum value, and a fourth measuring time period is predefined after the third measuring time period, and a minimum value of the excess air ratio, represented by the measurement signal of the exhaust gas probe, is determined as a function of the signal profile of the measurement signal of the exhaust gas probe during the fourth measuring time period, specifically as a second minimum value; and a second probe characteristic value is determined as a function of the first and second minimum values.

BRIEF DESCRIPTION OF THE DRAWINGS

Example embodiments are explained in detail below with reference to the drawings, in which.

DETAILED DESCRIPTION

Figure 1:
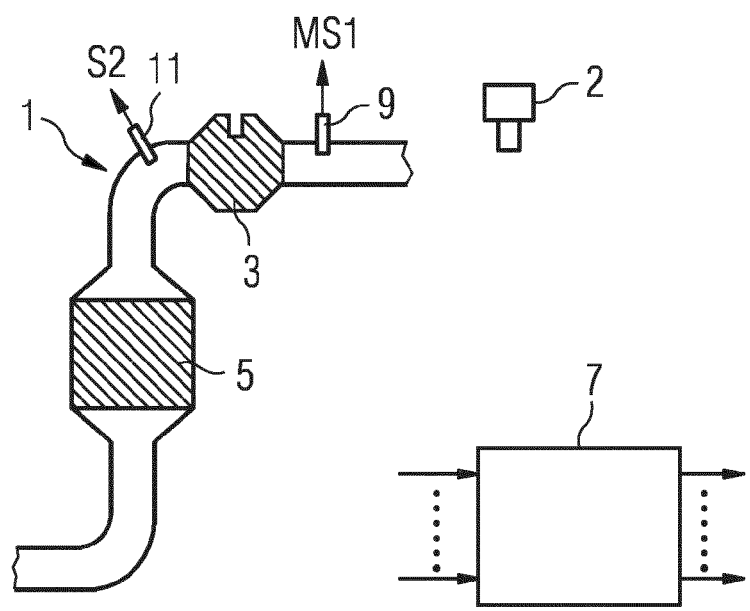
FIG. 1 shows an exhaust system of an internal combustion engine and an assigned control device.

Embodiments of the present invention provide a method and a device for operating an internal combustion engine, which method and device contribute to low-emission operation of the internal combustion engine.

One embodiment provides a method and a corresponding device for operating an internal combustion engine having an exhaust gas probe which is arranged in an exhaust system of the internal combustion engine upstream of or in an exhaust gas catalytic converter and whose measurement signal is characteristic of an oxygen content of the exhaust gas which flows past said exhaust gas probe.

An excess air ratio is predefined, has a predefined forced excitation applied thereto, and is set by means of corresponding actuation of at least one actuator device which influences the mixture. In a fashion which correlates with a rising edge of the forced excitation, a first measuring time period is predefined and a maximum value of the excess air ratio, represented by the measurement signal of the exhaust gas probe, is determined as a function of the signal profile of the measurement signal of the exhaust gas probe during the first measuring time period, specifically as a first maximum value. Also in a fashion which correlates with the rising edge of the forced excitation, a second measuring time period is predefined after the first measuring time period, and a maximum value of the excess air ratio, represented by the measurement signal of the exhaust gas probe, is determined as a function of the signal profile of the measurement signal of the exhaust gas probe during the second measuring time period, specifically as a second maximum value. A first probe characteristic value is determined as a function of the first and second maximum values.

In this way it is particularly easily possible to detect a change in the dynamic behavior of the exhaust gas probe by means of the first probe characteristic value. In this context, it is advantageous if the first measuring time period is predefined in such a way that in the case of a reference exhaust gas probe, which can also be referred to as a nominal exhaust gas probe, the first and second maximum values are very close to one another, and therefore have approximately the same value, in particular the same value.

According to one embodiment, in a fashion correlating with a falling edge of the forced excitation, a third measuring time period is predefined and a minimum value of the excess air ratio, represented by the measurement signal of the exhaust gas probe, is determined as a function of the signal profile of the measurement signal of the exhaust gas probe during the third measuring time period, specifically as a first minimum value. In a fashion correlating with the falling edge of the forced excitation, a fourth measuring time period is predefined after the third measuring time period, and a minimum value of the excess air ratio, represented by the measurement signal of the probe, is determined as a function of the signal profile of the measurement signal of the exhaust gas probe during the fourth measuring time period, specifically as a second minimum value. A second probe characteristic value is determined as a function of the first and second minimum values.

In this way, it is likewise particularly easily possible to detect a change in the dynamic behavior of the exhaust gas probe by means of the second probe characteristic value. In this context, it is advantageous if the first measuring time period is predefined in such a way that in the case of a reference exhaust gas probe, which can also be referred to as a nominal exhaust gas probe, the first and second minimum values are very close to one another, and therefore have approximately the same value, in particular the same value.

According to a further embodiment, a third probe characteristic value, which is representative of an asymmetrical change in the measurement signal behavior of the exhaust gas probe, is determined as a function of the first and second probe characteristic values. In this way it is effectively possible to detect an asymmetrical change in the measurement signal behavior of the exhaust gas probe.

According to a further embodiment, the first probe characteristic value is determined as a function of a difference between the first and second maximum values. This permits the first probe characteristic value to be determined in a way which is particularly simple in terms of computing technology.

According to a further embodiment, the second probe characteristic value is determined as a function of a difference between the first and second minimum values. This permits the first probe characteristic value to be determined in a way which is particularly simple in terms of computing technology.

According to a further embodiment, the third probe characteristic value is determined as a function of a ratio of the first probe characteristic value to the second probe characteristic value. This permits particularly reliable detection of an asymmetrical change in the measurement signal behavior of the exhaust gas probe.

According to a further embodiment, the third probe characteristic value is determined by means of a characteristic diagram as a function of the first and second probe characteristic values. This permits the determination of the third probe characteristic value to be implemented in a way which is particularly favorable in terms of computing technology, in particular also with respect to the avoidance of undesired division by zero.

According to a further embodiment, the third probe characteristic value is adapted as a function of a correction value which is determined as a function of a rotational speed of a crankshaft of the internal combustion engine and/or an air mass flow rate. In this way, undesired interference influences can be corrected particularly simply and effectively.

According to a further embodiment, a system model of a lambda controller is adapted as a function of the third probe characteristic value. In this way, a contribution can be made to particularly low emission of pollutants.

According to a further embodiment, the predefined excess air ratio is adapted as a function of the third probe characteristic value. In this way, a contribution can also be made to particularly low emission of pollutants.

Other embodiments provide a method and a corresponding device for operating an internal combustion engine having an exhaust gas probe which is arranged in the exhaust system of the internal combustion engine upstream of or in an exhaust gas catalytic converter and whose measurement signal is characteristic of a residual oxygen content of the exhaust gas which flows past said exhaust gas probe.

An excess air ratio is predefined, has a predefined forced excitation applied thereto and is set by means of corresponding actuation of at least one actuator device which influences the mixture. In a fashion correlating with a falling edge of the forced excitation, a third measuring time period is predefined and a minimum value of the excess air ratio, represented by the measurement signal of the exhaust gas probe, is determined as a function of the signal profile of the measurement signal of the exhaust gas probe during the third measuring time period, specifically as a first minimum value. In addition, in a fashion correlating with the falling edge of the forced excitation, a fourth measuring time period is predefined after the third measuring time period, and a minimum value of the excess air ratio, represented by the measurement signal of the exhaust gas probe, is determined as a function of the signal profile of the measurement signal of the exhaust gas probe during the fourth measuring time period, specifically as a second minimum value. A second probe characteristic value is determined as a function of the first and second minimum values. The advantage and advantageous refinements of the further aspect correspond basically to those of the first aspect.

The internal combustion engine comprises an intake section, an engine block, a cylinder head and an exhaust system 1 (FIG. 1). The intake section preferably comprises a throttle valve, and also a collector and an intake manifold which leads to a cylinder via an intake duct into the engine block. The engine block also comprises a crankshaft which is coupled to the piston of the cylinder via a connecting rod.

The cylinder head comprises a valve drive with a gas inlet valve and with a gas outlet valve. It also comprises an injection valve 2 and preferably a spark plug. Alternatively, the injection valve 2 can also be arranged in an intake manifold.

An exhaust gas catalytic converter 3, which is preferably embodied as a three-way catalytic converter, is arranged in the exhaust system 1. In addition, a further exhaust gas catalytic converter 5, which is embodied as an NOx catalytic converter, is optionally arranged in the exhaust system 1.

A control device 7 is provided which is assigned sensors which sense various measurement variables and respectively determine the value of the measurement variable. The control device 7 is designed to determine, as a function of at least one of the measurement variables, manipulated variables which are then converted into one or more actuation signals for controlling the actuator devices, in particular for controlling their actuator drives which act on actuator elements of the actuator devices.

The control device 7 can also be referred to as a device for operating the internal combustion engine.

The sensors are a pedal position sensor, an air mass flow sensor, which senses an air mass flow MAF upstream of the throttle valve, a temperature sensor which senses an intake air temperature, an intake manifold pressure sensor, a crankshaft angle sensor which senses a crankshaft angle of a crankshaft and to which a rotational speed N is then assigned.

In addition, an exhaust gas probe 9 is provided which is arranged upstream of the exhaust gas catalytic converter 3 or, if appropriate, also in the exhaust gas catalytic converter 3. The measurement signal MS1 of the exhaust gas probe 9 is representative of a residual oxygen content of the exhaust gas which flows past said exhaust gas probe, and is therefore characteristic of the air/fuel ratio in the combustion chamber of the cylinder and upstream of the exhaust gas probe 9 before the oxidation of the fuel and therefore representative of a sensed excess air ratio LAM_AV.

If appropriate, a further exhaust gas probe 11 can be arranged downstream of the exhaust gas probe 9, in or downstream of the exhaust gas catalytic converter 3, which further exhaust gas probe 11 also senses a residual oxygen content of the exhaust gas flowing past said further exhaust gas probe 11. The exhaust gas probe 9 is preferably a linear lambda probe. The further exhaust gas probe 11 is preferably a binary lambda probe but it can basically also be a linear lambda probe. The same applies to the exhaust gas probe 9.

Depending on the embodiment, any desired subset of the specified sensors may be present, or additional sensors may also be present. The actuator elements are, for example, the throttle valve, the gas inlet and outlet valves, the injection valve 2 or the spark plug.

Of course, the internal combustion engine can, if appropriate, comprise a plurality of cylinders which are then also, if appropriate, assigned corresponding actuator drives and sensors, if appropriate.

Figure 2:
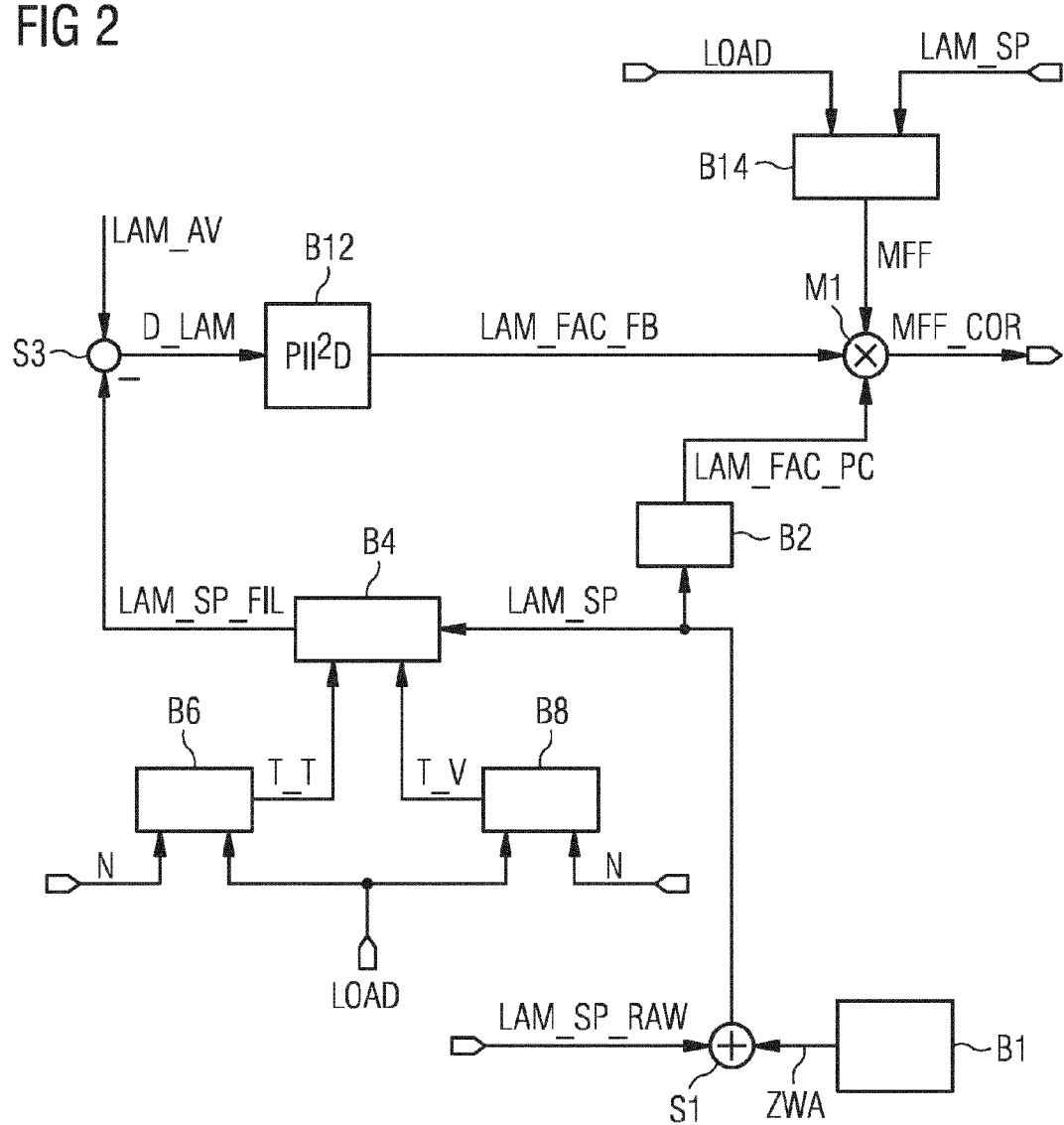
FIG. 2 shows a block diagram of a lambda controller which is embodied, in particular, in the control device.

A block diagram of a lambda controller which is embodied by means of the control device 7 is illustrated in FIG. 2.

In a particularly simple refinement a predefined excess air ratio LAM_SP_RAW can be permanently predefined for regular operation. It is preferably determined, for example, as a function of the current operating mode of the internal combustion engine such as a homogeneous mode or stratified mode and/or as a function of the operating variables of the internal combustion engine.

A block B1 is designed to determine a forced excitation ZWA which is preferably embodied in the form of a periodic square-wave signal which oscillates about a neutral value. On the output side of a summing point S1, a predefined forcibly excited excess air ratio LAM_SP is made available.

The predefined forcibly excited excess air ratio LAM_SP is fed to a block B2 which contains a pilot controller and generates a lambda pilot-control factor LAM_FAC_PC as a function of the predefined forcibly excited excess air ratio LAM_SP.

A filter is embodied in a block B4, specifically in particular on the basis of a system model by means of which the predefined forcibly excited excess air ratio LAM_SP is filtered and in this way a predefined filtered forcibly excited excess air ratio LAM_SP_FIL is generated.

A block B6 is provided whose input variables are a rotational speed N and/or a load LOAD. The load can be represented, for example, by the intake manifold pressure or by the air mass flow MAF. The block B6 is designed to determine a lag time T_T as a function of the rotational speed N and/or the load LOAD. For this purpose, a characteristic diagram can be stored, for example, in the block B6, and the lag time T_T can be determined by means of characteristic diagram interpolation.

In addition, a block B8 is provided whose input variables are the rotational speed N and/or the load LOAD. The block B8 is designed to determine a delay time T_V as a function of its input of its input variables, specifically preferably by means of characteristic diagram interpolation by means of a characteristic diagram which is stored in the block B8. The characteristic diagrams are preferably determined in advance by trials or simulations.

The lag time T_T and also the delay T_V are characteristic of a gas propagation time which passes between a time which is relevant for the metering of fuel up to a correlating profile of the measurement signal MS1 at the exhaust gas probe 9. The lag time T_T and/or the delay time T_V are preferably input variables of the block B4, and therefore of the filter.

The filter preferably comprises a Padé filter. Furthermore, the block B4 preferably also comprises a low-pass filter which approximates, in particular, the behavior of the exhaust gas probe 9 as a function of the delay time T_V.

A detected excess air ratio LAM_AV, which is determined as a function of the measurement signal MS1 of the exhaust gas probe 9, is fed to a third summing point S3. A control difference D_LAM is determined in the third summing point as a function of the predefined filtered forcibly excited excess air ratio LAM_SP_FIL and the detected excess air ratio LAM_AV, by forming a difference.

The control difference D_LAM is an input variable of a block B12 in which a lambda controller is formed, specifically preferably as a $PII^2D$ controller. The manipulated variable of the lambda controller of the block B12 is a lambda control factor LAM_FAC_FB.

In addition, a block B14 is provided in which a fuel mass MFF which is to be metered in is determined as a function of a load LOAD and the predefined forcibly excited excess air ratio LAM_SP. The load LOAD is in this case preferably an air mass which flows into the respective combustion chamber of the respective cylinder per working cycle.

At a multiplication point M1, a corrected fuel mass MFF_COR which is to be metered in is determined by forming the product of the fuel mass MFF which is to be metered in, the lambda pilot-control factor LAM_FAC_PC and the lambda control factor LAM_FAC_FB. The injection valve 2 is then correspondingly actuated in order to meter in the corrected fuel mass MAFF_COR which is to be metered in.

Figure 3:
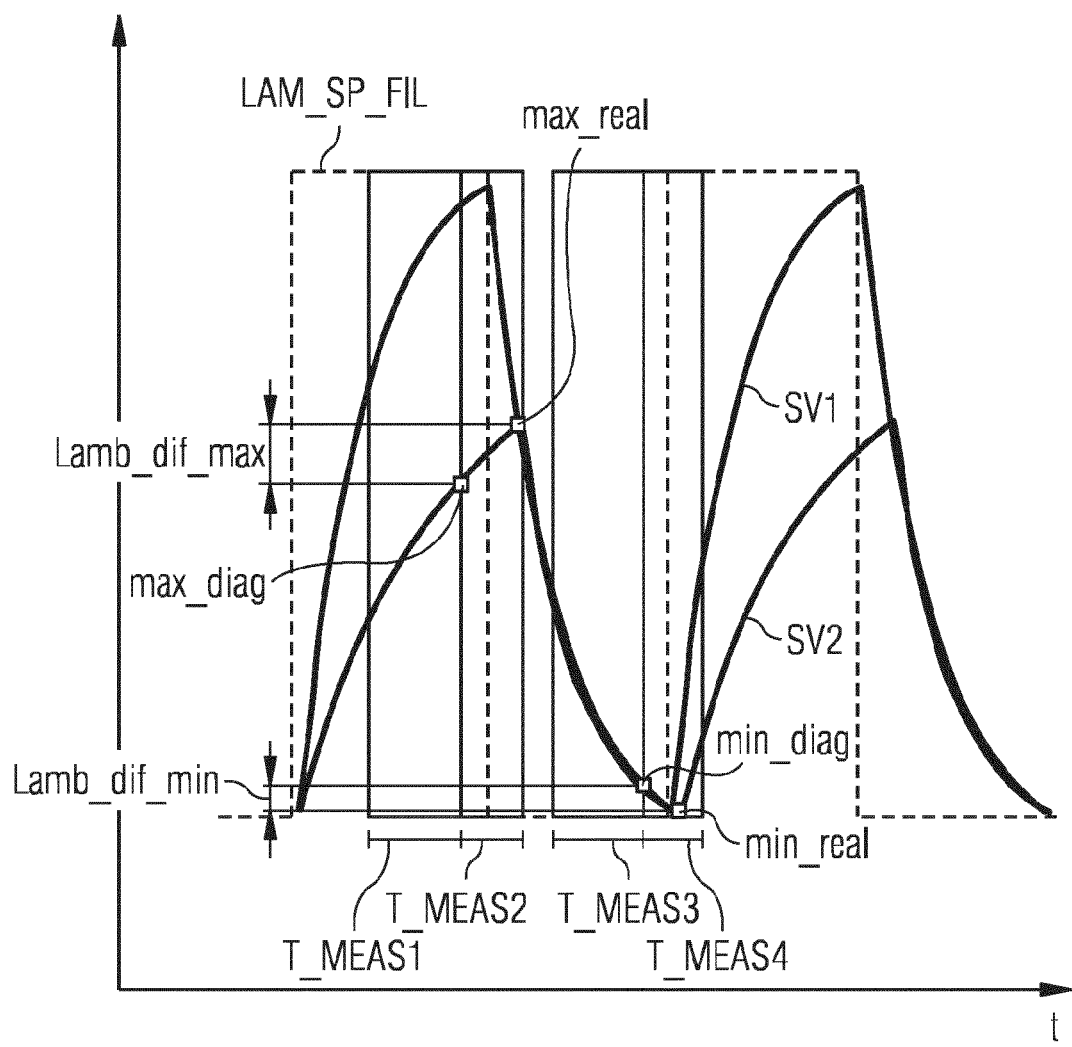
FIG. 3 shows signal profiles.

FIG. 3 illustrates a plurality of signal profiles, specifically plotted against the time t. The dashed line represents the profile of the predefined filtered forcibly excited excess air ratio LAM_SP_FIL. SV1 represents the signal profile of the measurement signal MS1 of the exhaust gas probe 9 for the case of an, in particular, new exhaust gas probe 9 or else of a reference exhaust gas probe, which can also be referred to as a nominal exhaust gas probe. SV2 represents a profile of the measurement signal MS1 of the exhaust gas probe 9 for a case of an asymmetrically slow exhaust gas probe 9.

In a fashion correlating with a rising edge of the forced excitation, that is to say in this case of the predefined forcibly excited excess air ratio LAM_SP, a first measuring time period T_MEAS1 is predefined. In addition, after the first measuring time period T_MEAS1, a second measuring time period T_MEAS2 is predefined. Furthermore, in a fashion correlating with a falling edge of the forced excitation, a third measuring time period T_MEAS3 is predefined. A fourth measuring time period T_MEAS4 is also correspondingly predefined after the third measuring time period T_MEAS3.

A maximum value of the excess air ratio, represented by the measurement signal MS1 of the exhaust gas probe 9, that is to say of the detected air ratio LAM_AV, is determined as a function of the signal profile of the measurement signal MS1 of the exhaust gas probe 9, represented in this case by the signal profile SV2, during the first measuring time period T_MEAS1, specifically as a first maximum value max_diag.

A maximum value of the excess air ratio, represented by the measurement signal MS1 of the exhaust gas probe 9, is determined as a function of the signal profile of the measurement signal MS of the exhaust gas probe, that is to say in this case represented by the signal profile SV2, during the second measuring time period T_MEAS2, specifically as a second maximum value max_real. A first probe characteristic value Lamb_dif_max is determined as a function of the first and second maximum values max_diag, max_real, specifically preferably by forming a difference.

A minimum value of the excess air ratio, represented by the measurement signal MS1 of the exhaust gas probe 9, is determined as a function of the signal profile of the measurement signal MS1 of the exhaust gas probe 9 during the third measuring time period T_MEAS3, specifically as a first minimum value min_diag. A minimum value of the excess air ratio, represented by the measurement signal MS1 of the exhaust gas probe 9, is determined as a function of the signal profile of the measurement signal MS1 of the exhaust gas probe during the fourth measuring time period T_MEAS4, specifically as a second minimum value min_real.

A second probe characteristic value Lamb_dif_min is determined as a function of the first and second minimum values min_diag, min_real.

Figure 4:
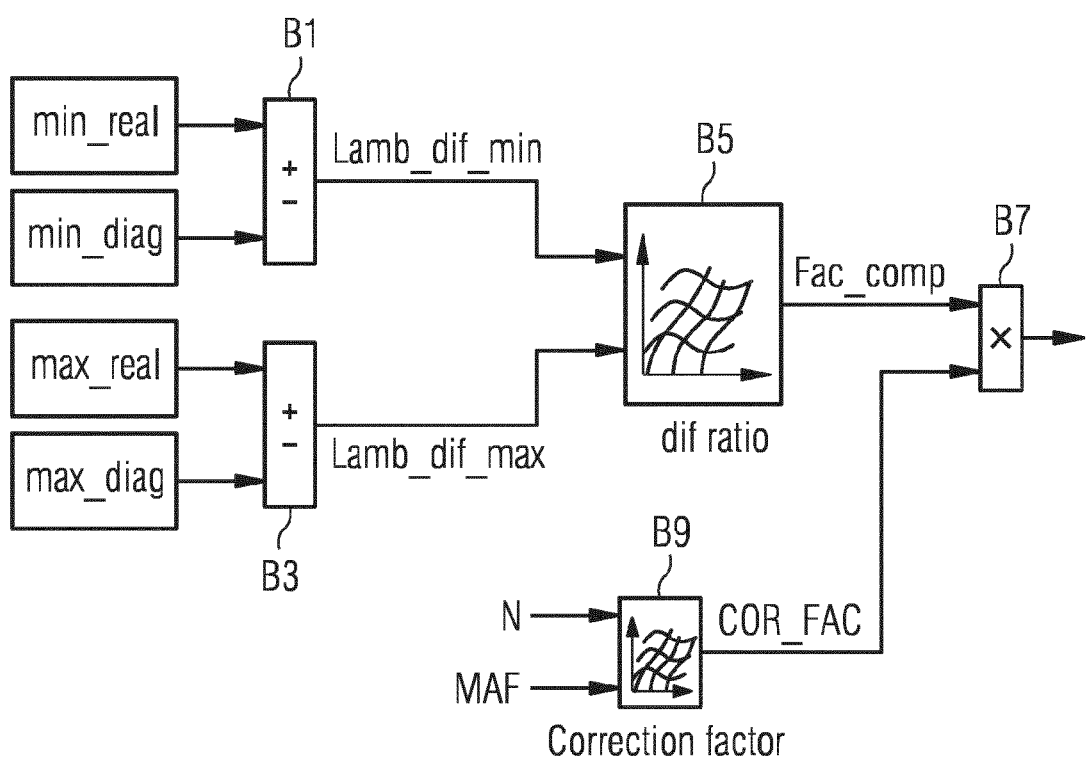
FIG. 4 shows a block diagram of elements of the control device.

FIG. 4 illustrates a further relevant part of the control device 7 in the form of a block diagram.

The first and second minimum values min_diag, min_real are fed to a block B1. The block B1 is designed to form the difference between the first minimum value min_diag and the second minimum value min_real and therefore determine the second probe characteristic value Lamb_dif_min.

The first and second maximum values max_diag, max_real are fed as input variables to a block B3. The block B3 is designed to determine a difference between the second and the first maximum value max_real, max_diag and to assign said difference to the first probe characteristic value Lamb_dif_max.

The first and second probe characteristic values Lamb_dif_max, Lamb_dif_min are fed to the input side of a block B5. The block B5 is designed to determine, as a function of its input variables, a third probe characteristic value Fac_comp which is representative of an asymmetrical change in the measurement signal behavior of the exhaust gas probe 9. For this purpose, it is designed, in particular, to determine the third probe characteristic value Fac_comp as a function of a ratio of the first probe characteristic value Lamb_dif_max to the second probe characteristic value Lamb_dif_min.

In this context it is particularly advantageous if, for this purpose, a characteristic diagram is provided whose input variables are the first and second probe characteristic values Lamb_dif_max, Lamb_dif_min. In this way it is possible for the ratio to be suitably determined in a simple way, and in particular for undesired division by zero to be avoided. The characteristic diagram is preferably determined in advance by trials or a simulation.

The third probe characteristic value Fac_comp is a measure of the asymmetry of the dynamics. It can preferably also be corrected by means of a correction value COR_FAC which is determined as a function of a rotational speed N and of a load LOAD, that is to say, in particular, the air mass flow MAF. In this way it is possible, in particular, to correct interference influences.

On the basis of the third probe characteristic value Fac_comp it is possible to scale a diagnostic value which is based on the amplitude of the signal profiles of the measurement signal MS1 of the exhaust gas probe 9. It is therefore possible for early fault detection of the asymmetry to be achieved.

The third probe characteristic value Fac_comp can optionally be used to influence the system model for the lambda control and as a result to compensate the influence of emissions due to asymmetrically aged exhaust gas probes 9. For this purpose, one or more filter constants of the filter in the block B4 and/or the lag time T_T and/or the delay time T_V can be adapted, specifically as a function of the third probe characteristic value Lamb_dif_min, and therefore corrected in the associated direction in accordance with the detected asymmetry. In this way it is possible to reduce both a lambda controller deflection and therefore overshooting of the mixture as well as a displacement of the mixture as a result of a supposedly incorrect controller intervention during the forced excitation ZWA. This contributes to reduced emissions of pollutants.

Furthermore, it is additionally or alternatively optionally possible to displace a mixture center position as a function of the third probe characteristic value Fac_comp. This can be done, for example, by adapting the predefined excess air ratio LAM_SP_RAW.

In the case of asymmetrical errors, one-sided overshooting of the mixture occurs, as a result of which the loading of the exhaust gas catalytic converter 3 with oxygen is shifted to the edge regions. In the case of worsening of the dynamics in the rich/lean direction, it is the case in particular in the case of lean faults that increased lean deflections occur since supposedly a rich mixture is still detected, and adjusted in the lean direction, for a very long time by the controller. This leads to a situation in which the exhaust gas catalytic converter 3 is ultimately loaded with oxygen to a greater degree and therefore can no longer compensate further lean deflections. General displacement of the center position of the mixture, in this case in the rich direction, as a function of the asymmetry and ultimately of the thus expected displacement can remedy this by virtue of the fact that a buffer for the storage of NOx is produced in the exhaust gas catalytic converter 3. The same applies to ageing of the exhaust gas probe 9 in the opposite direction.

The invention claimed is:

1. A method for operating an internal combustion engine having an exhaust gas probe arranged in an exhaust system upstream of or in an exhaust gas catalytic converter, the method comprising:
   predefining an excess air ratio,
   applying, by a control device, a predefined forced excitation to the excess air ratio,
   actuating, by the control device, at least one actuator device according to the predefined excess air ratio with the applied predefined forced excitation,
   receiving at the control device, from the exhaust as probe, a measurement signal characteristic of a residual oxygen content of the exhaust gas, and
   in a manner correlating with a rising edge of the forced excitation:
      predefining, by the control device, a first measuring time period,
      determining, by the control device, a first maximum value of the excess air ratio, represented by the measurement signal of the exhaust gas probe, as a function of a signal profile of the measurement signal of the exhaust gas probe during the first measuring time period,
      predefining, by the control device, a second measuring time period after the first measuring time period, and determining, by the control device, a second maximum value of the excess air ratio, represented by the measurement signal of the exhaust gas probe, as a function of a signal profile of the measurement signal of the exhaust gas probe during the second measuring time period, determining, by the control device, a first probe characteristic value as a function of the determined first and second maximum values, and actuating an injection valve as a function of the determined first probe characteristic value.

2. The method of claim 1, comprising determining the first probe characteristic value as a function of a difference between the first and second maximum values.

3. The method as claimed in claim 1, comprising:
in a manner correlating with a falling edge of the forced excitation:
predefining a third measuring time period, and
determining a first minimum value of the excess air ratio, represented by the measurement signal of the exhaust gas probe, as a function of a signal profile of the measurement signal of the exhaust gas probe during the third measuring time period,
predefining a fourth measuring time period after the third measuring time period, and
determining a second minimum value of the excess air ratio, represented by the measurement signal of the exhaust gas probe, as a function of the signal profile of the measurement signal of the exhaust gas probe during the fourth measuring time period, and
determining a second probe characteristic value as a function of the determined first and second minimum values.

4. The method of claim 3, comprising determining a third probe characteristic value, which is representative of an asymmetrical change in the measurement signal behavior of the exhaust gas probe, as a function of the first and second probe characteristic values.

5. The method of claim 3, comprising determining the second probe characteristic value as a function of a difference between the first and second minimum values.

6. The method of claim 4, comprising determining the third probe characteristic value as a function of a ratio of the first probe characteristic value to the second probe characteristic value.

7. The method of claim 4, comprising determining the third probe characteristic value as a function of the first and the second probe characteristic value according to a characteristic diagram.

8. The method of claim 4, comprising adapting the third probe characteristic value as a function of a correction value determined as a function of a rotational speed of a crankshaft of the internal combustion engine or a load variable.

9. The method of claim 4, comprising adapting a system model of a lambda controller as a function of the third probe characteristic value.

10. The method of claim 3, comprising adapting a predefined excess air ratio as a function of the third probe characteristic value.

11. A method for operating an internal combustion engine having an exhaust gas probe arranged in an exhaust system upstream of or in an exhaust gas catalytic converter, the method comprising:
applying, by a control device, a predefined forced excitation to the excess air ratio,
actuating, by the control device, at least one actuator device according to the predefined excess air ratio with the applied predefined forced excitation,
receiving at the control device, from the exhaust as probe, a measurement signal characteristic of a residual oxygen content of the exhaust gas, and
in a manner correlating with a falling edge of the forced excitation:
predefining, by the control device, a first measuring time period,
determining, by the control device, a first minimum value of the excess air ratio, represented by the measurement signal of the exhaust gas probe, as a function of a signal profile of the measurement signal of the exhaust gas probe during the first measuring time period, specifically as a first minimum value,
predefining, by the control device, a second measuring time period after the first measuring time period, and
determining, by the control device, a second minimum value of the excess air ratio, represented by the measurement signal of the exhaust gas probe, as a function of a signal profile of the measurement signal of the exhaust gas probe during the second measuring time period,
determining, by the control device, a first probe characteristic value as a function of the determined first and second minimum values, and
actuating an injection valve as a function of the determined first probe characteristic value.

12. A device for operating an internal combustion engine having an exhaust gas probe arranged in an exhaust system upstream of or in an exhaust gas catalytic converter, wherein the device is configured to:
predefine an excess air ratio,
apply a predefined forced excitation to the excess air ratio,
actuate at least one actuator device according to the predefined excess air ratio with the applied predefined forced excitation,
receive from the exhaust as probe a measurement signal characteristic of a residual oxygen content of the exhaust gas, and
in a manner correlating with a rising edge of the forced excitation:
predefine a first measuring time period,
determine a first maximum value of the excess air ratio, represented by the measurement signal of the exhaust gas probe, as a function of a signal profile of the measurement signal of the exhaust gas probe during the first measuring time period, specifically as a first maximum value,
predefine a second measuring time period after the first measuring time period, and
determine a second maximum value of the excess air ratio, represented by the measurement signal of the exhaust gas probe, as a function of a signal profile of the measurement signal of the exhaust gas probe during the second measuring time period,
determine a first probe characteristic value as a function of the determined first and second maximum values, and
actuate an injection valve as a function of the determined first probe characteristic value.

13. A device for operating an internal combustion engine having an exhaust gas probe arranged in an exhaust system upstream of or in an exhaust gas catalytic converter, wherein the device is configured to:
predefine an excess air ratio,
apply a predefined forced excitation to the excess air ratio,
actuate at least one actuator device according to the predefined excess air ratio with the applied predefined forced excitation, receive from the exhaust as probe a measurement signal characteristic of a residual oxygen content of the exhaust gas, and in a manner correlating with a falling edge of the forced excitation:
  predefine a first measuring time period,
  determine a first minimum value of the excess air ratio, represented by the measurement signal of the exhaust gas probe, as a function of a signal profile of the measurement signal of the exhaust gas probe during the first measuring time period,
  predefine a second measuring time period after the first measuring time period, and
  determine a second minimum value of the excess air ratio, represented by the measurement signal of the exhaust gas probe, is determined as a function of a signal profile of the measurement signal of the exhaust gas probe during the second measuring time period, determine a first probe characteristic value as a function of the determined first and second minimum values, and actuate an injection valve as a function of the determined first probe characteristic value.

* * * * *